United States Patent
Milstead (10) Patent No.: US 9,122,551 B2
(45) Date of Patent: Sep. 1, 2015

(54) METHODS AND SYSTEMS FOR GENERATING READ-ONLY OPERATING SYSTEMS

(75) Inventor: James M. Milstead, Madison, AL (US)

(73) Assignee: The Boeing Comapny, Chicago, IL (US)

( * ) Notice: Subject to any disclaimer, the term of this patent is extended or adjusted under 35 U.S.C. 154(b) by 1056 days.

(21) Appl. No.: 13/163,250

(22) Filed: Jun. 17, 2011

(65) Prior Publication Data

US 2012/0324438 A1    Dec. 20, 2012

(51) Int. Cl.
*G06F 9/44* (2006.01)
*G06F 9/445* (2006.01)

(52) U.S. Cl.
CPC ........................ *G06F 8/61* (2013.01)

(58) Field of Classification Search
CPC ...... G06F 8/20; G06F 8/36; G06F 8/60–8/63; G06F 8/65; G06F 8/71
See application file for complete search history.

(56) References Cited

U.S. PATENT DOCUMENTS

| | | | |
|---|---|---|---|
| 5,727,213 A | 3/1998 | Vander Kamp et al. | |
| 5,768,597 A * | 6/1998 | Simm | 717/174 |
| 5,909,580 A * | 6/1999 | Crelier et al. | 717/141 |
| 5,966,540 A * | 10/1999 | Lister et al. | 717/174 |
| 5,978,585 A * | 11/1999 | Crelier | 717/145 |
| 6,117,187 A * | 9/2000 | Staelin | 717/169 |
| 6,122,734 A | 9/2000 | Jeon | |
| 6,178,546 B1 * | 1/2001 | McIntyre | 717/115 |
| 6,490,723 B1 * | 12/2002 | Bearden et al. | 717/174 |
| 6,546,553 B1 * | 4/2003 | Hunt | 717/174 |
| 6,606,744 B1 * | 8/2003 | Mikurak | 717/174 |
| 6,889,167 B2 * | 5/2005 | Curry, III | 702/183 |
| 6,938,250 B2 | 8/2005 | Cohen et al. | |
| 6,959,262 B2 * | 10/2005 | Curry, III | 702/183 |
| 6,993,642 B2 | 1/2006 | Burkhardt et al. | |
| 6,993,649 B2 | 1/2006 | Hensley | |
| 7,047,522 B1 * | 5/2006 | Dixon et al. | 717/131 |
| 7,496,743 B1 | 2/2009 | Salazar et al. | |
| 7,506,318 B1 * | 3/2009 | Lindo et al. | 717/130 |
| 7,519,630 B2 * | 4/2009 | Brown et al. | 1/1 |
| 7,594,143 B2 * | 9/2009 | Chin et al. | 714/38.11 |
| 7,703,073 B2 * | 4/2010 | Illowsky et al. | 717/121 |
| 7,716,652 B2 * | 5/2010 | Smith et al. | 717/130 |
| 7,743,242 B2 | 6/2010 | Oberhaus et al. | |
| 7,765,541 B1 | 7/2010 | Noordergraaf et al. | |
| 7,945,897 B1 * | 5/2011 | Cook | 717/121 |

(Continued)

OTHER PUBLICATIONS

Cowan et al., A Toolkit for Specializing Production Operating System Code, publisher unknown, published on 1997, pp. 1-16.*

(Continued)

*Primary Examiner* — Tuan Q. Dam
*Assistant Examiner* — Zheng Wei
(74) *Attorney, Agent, or Firm* — Armstrong Teasdale LLP (57) ABSTRACT

Methods and systems for use in generating read-only production operating systems including at least one application for use with a target workstation are disclosed. One example method includes providing a baseline operating system based on a hardware profile of the target workstation, executing an installation script for a target application, adding at least one resource to the baseline operating system based on an error message indicating at least one resource called by the installation script is not found, and writing, at a computing device, a production operating system to a read-only media. The production operating includes the baseline operating system and the at least one resource.

19 Claims, 5 Drawing Sheets

(56) References Cited

U.S. PATENT DOCUMENTS

| | | |
|---|---|---|
| 7,975,084 B1 | 7/2011 | Kalbarga |
| 8,127,277 B2 * | 2/2012 | Albot et al. ............. 717/127 |
| 8,151,245 B2 * | 4/2012 | Oberlin et al. ............. 717/121 |
| 8,307,358 B1 * | 11/2012 | Koryakina et al. ............. 717/174 |
| 8,443,358 B1 * | 5/2013 | Larkin et al. ............. 717/174 |
| 8,527,964 B2 * | 9/2013 | Moriat et al. ............. 717/131 |
| 8,776,029 B2 * | 7/2014 | Puthuff ............. 717/131 |
| 2004/0117413 A1 * | 6/2004 | Brown et al. ............. 707/203 |
| 2004/0172219 A1 * | 9/2004 | Curry, III ............. 702/186 |
| 2004/0172221 A1 * | 9/2004 | Curry, III ............. 702/186 |
| 2004/0226010 A1 * | 11/2004 | Suorsa ............. 717/174 |
| 2005/0034117 A1 * | 2/2005 | Emaru et al. ............. 717/174 |
| 2006/0020937 A1 | 1/2006 | Schaefer |
| 2006/0031831 A1 * | 2/2006 | Templin et al. ............. 717/175 |
| 2006/0248513 A1 * | 11/2006 | Foster et al. ............. 717/127 |
| 2007/0006175 A1 * | 1/2007 | Durham et al. ............. 717/131 |
| 2007/0136721 A1 * | 6/2007 | Dunshea et al. ............. 717/174 |
| 2008/0103736 A1 * | 5/2008 | Chin et al. ............. 703/2 |
| 2008/0127120 A1 * | 5/2008 | Kosche et al. ............. 717/131 |
| 2009/0064086 A1 * | 3/2009 | Faus et al. ............. 717/100 |
| 2009/0210869 A1 * | 8/2009 | Gebhart et al. ............. 717/174 |
| 2009/0235266 A1 * | 9/2009 | Hack et al. ............. 718/104 |
| 2009/0300604 A1 * | 12/2009 | Barringer ............. 717/178 |
| 2009/0307763 A1 * | 12/2009 | Rawlins et al. ............. 726/5 |
| 2010/0235828 A1 * | 9/2010 | Nishimura et al. ............. 717/174 |
| 2011/0055824 A1 * | 3/2011 | Benari ............. 717/176 |
| 2011/0072424 A1 * | 3/2011 | Choi et al. ............. 717/174 |
| 2012/0066665 A1 * | 3/2012 | Kunze ............. 717/124 |
| 2013/0263113 A1 * | 10/2013 | Cavazza et al. ............. 717/178 |
| 2014/0040878 A1 * | 2/2014 | Mann ............. 717/174 |

OTHER PUBLICATIONS

International Search Report and Written Opinion for International Application No. PCT/US2012/039541; Sep. 24, 2012; 19 pages.

* cited by examiner

METHODS AND SYSTEMS FOR GENERATING READ-ONLY OPERATING SYSTEMS

BACKGROUND

The field of the disclosure relates generally to generating production operating systems and, more particularly, to methods and systems for use in generating read-only production operating systems for target workstations.

Workstations are generally used during production to program various types of products. Specifically, for example, workstations may be used to program integrated circuits, such as a programmable logic device (PLD), programmable gate array (PGA), microcontroller, etc. Workstations often include generic operating system and programming tool applications, as well as other applications such as anti-virus applications. Workstations may be connected to a network, such as the Internet, or separate from a network.

In various production environments, workstations include generic operating systems that include resources not used by the workstation in performing its function as a production programmer. The extraneous resources allocate space within the memory of the workstation that is essentially unused. The unused memory results in an attack space for unwanted applications, such as, for example, virus applications and/or malware applications. As a result, the workstations can unknowingly provide a platform for the unwanted applications to spread to the product being programmed by the workstation and/or other devices connected to the workstations.

BRIEF DESCRIPTION

In one aspect, a method for use in generating a read-only production operating system including at least one application for use with a target workstation is provided. The method includes providing a baseline operating system based on a hardware profile of the target workstation, executing an installation script for a target application, adding at least one resource to the baseline operating system based on an error message indicating at least one resource called by the installation script is not found, and writing, at a computing device, a production operating system to a read-only media. The production operating system includes the baseline operating system and said at least one resource.

In another aspect, a developer workstation for use in generating a read-only production operating system including at least one application for use with a target workstation is provided. The developer workstation includes a memory including a plurality of resources and at least one processor coupled to the memory. The processor is configured to generate a virtual machine for booting a baseline operating system. The baseline operating system is configured for a target processor and includes an enhanced write filter. The processor is configured to execute the baseline operating system in the virtual machine, execute an installation script for a target application to the baseline operating system, detect at least one error message indicating at least one resource called by the installation script and omitted from the baseline operating system, adding the at least one resource from said memory to the baseline operating system, and writing a production operating system to a read-only media. The resource includes at least one of a file, a registry key and an instruction. The production operating system includes the baseline operating system and the at least one resource.

The features, functions, and advantages that have been discussed can be achieved independently in various embodiments or may be combined in yet other embodiments further details of which can be seen with reference to the following description and drawings.

DETAILED DESCRIPTION

The subject matter described herein relates generally to generating a production operating system for a target workstation and writing the production operating system to a read-only media, where the production operating system is substantially free of unwanted applications. Unwanted applications may include viruses, malware, or other programs that may affect the performance of a target workstation and/or cause security issues for the target workstation.

In one embodiment, technical effects of the methods, systems, and computer-readable media described herein include at least one of: (a) providing a baseline operating system based on a hardware profile of the target workstation, (b) executing an installation script for a target application, (c) adding at least one resource to the baseline operating system based on an error message indicating at least one resource called by the installation script is not found, and (d) writing, at a computing device, a production operating system to a read-only media. The production operating system includes the baseline operating system and said at least one resource.

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

Figure 1:
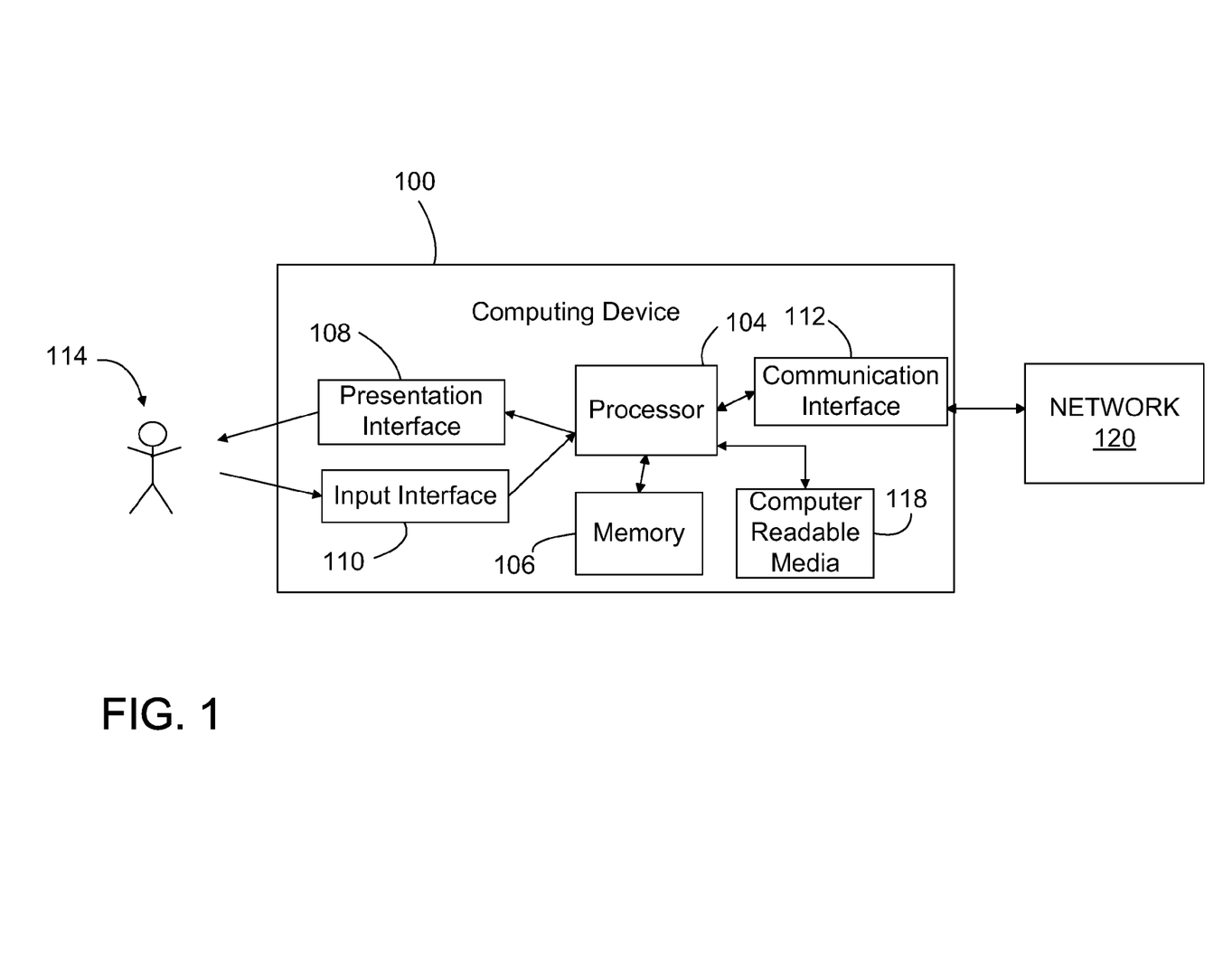
FIG. 1 is a block diagram of an exemplary computing device.

FIG. 1 is a block diagram of an exemplary computing device 100 that may be used to automatically generate a production operating system. In the exemplary embodiment, computing device 100 includes a memory 106 and a processor 104 that is coupled to memory 106 for executing programmed instructions. Processor 104 may include one or more processing units (e.g., in a multi-core configuration). Computing device 100 is programmable to perform one or more operations described herein by programming memory 106 and/or processor 104. For example, processor 104 may be programmed by encoding an operation as one or more executable instructions and providing the executable instructions in memory device 110.

Processor 104 may include, but is not limited to, a general purpose central processing unit (CPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by processor 104, cause processor 104 to perform at least a portion of the methods described herein. The above examples are exemplary only, and thus are not intended to limit in any way the definition and/or meaning of the term processor.

Memory device 106, as described herein, is one or more devices that enable information such as executable instructions and/or other data to be stored and retrieved. Memory device 106 may include one or more computer-readable media, such as, without limitation, dynamic random access memory (DRAM), static random access memory (SRAM), a solid state disk, and/or a hard disk. Memory device 106 may be configured to store, without limitation, executable instructions, operating systems, hardware profiles, resources, installation scripts and/or any other type of data suitable for use with the methods and systems described herein.

In the exemplary embodiment, computing device 100 includes a presentation interface 108 that is coupled to processor 104. Presentation interface 108 outputs (e.g., display, print, and/or otherwise output) information such as, but not limited to, installation data, configuration data, test data, error messages, and/or any other type of data to a user 114. For example, presentation interface 108 may include a display adapter (not shown in FIG. 1) that is coupled to a display device, such as a cathode ray tube (CRT), a liquid crystal display (LCD), a light-emitting diode (LED) display, an organic LED (OLED) display, and/or an "electronic ink" display. In some embodiments, presentation interface 120 includes more than one display device. In addition, or in the alternative, presentation interface 108 may include a printer.

In the exemplary embodiment, computing device 100 includes an input interface 110 that receives input from user 114. For example, input interface 110 may be configured to receive target application selections, installation instructions, configuration installations, testing instructions, and/or any other type of commands from developer 114 suitable for use with the methods and systems described herein. In the exemplary embodiment, input interface 110 is coupled to processor 104 and may include, for example, a keyboard, a pointing device, a mouse, a stylus, a touch sensitive panel (e.g., a touch pad or a touch screen), a gyroscope, an accelerometer, a position detector, and/or an audio input interface. A single component, such as a touch screen, may function as both a display device of presentation interface 108 and as input interface 110.

In the exemplary embodiment, computing device 100 includes a communication interface 112 coupled to memory 106 and/or processor 104. Communication interface 112 is coupled in communication with a remote device, such as another computing device 100. For example, communication interface 112 may include, without limitation, a wired network adapter, a wireless network adapter, and/or a mobile telecommunications adapter.

Instructions for operating systems and applications are located in a functional form on non-transitory memory 106 for execution by processor unit 104 to perform one or more of the processes described herein. These instructions in the different embodiments may be embodied on different physical or tangible computer-readable media, such as memory 106 or another memory, such as a computer-readable media 118, which may include, without limitation, a flash drive, CD-ROM, thumb drive, floppy disk, etc. Further, instructions are located in a functional form on non-transitory computer-readable media 118, which may include, without limitation, a flash drive, CD-ROM, thumb drive, floppy disk, etc. Computer-readable media 118 is selectively insertable and/or removable from computing device 100 to permit access and/or execution by processor 104. In one example, computer-readable media 118 includes an optical or magnetic disc that is inserted or placed into a CD/DVD drive or other device associated with memory 106 and/or processor 104. In some instances, computer-readable media 118 may not be removable.

Figure 2:
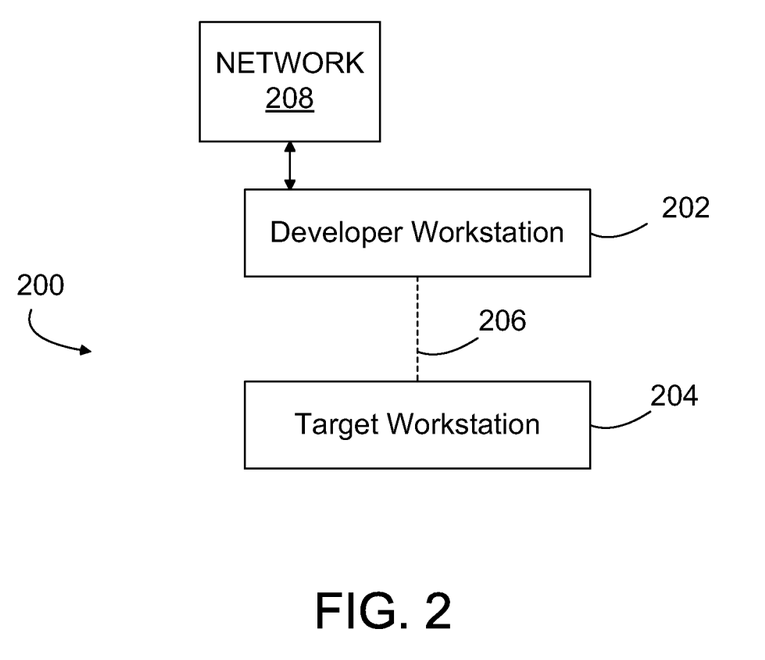
FIG. 2 is a block diagram of an exemplary developer system for use in generating a production operating system.

FIG. 2 illustrates an exemplary developer system 200, including a developer workstation 202 and a target workstation 204. Developer workstation 202 and target workstation 204 are example devices in which one or more of computing devices 100 may be utilized. It should be appreciated, however, that the description of computing device 100 herein is exemplary and should not be understood to limit potential configurations of developer workstation 202 and/or target workstation 204. As shown, developer workstation 202 and the target workstation 204 are not electrically connected to one another, directly or through a network 208. Instead, in this exemplary embodiment, data (e.g., instructions, operating systems, profiles, etc.) is transferred between target workstation 204 and developer workstation 202 by physically moving computer-readable media 118 therebetween (illustrated by dotted line 206). It is contemplated that a developer workstation may be electrically connected to target work station for communication therebetween in other embodiments. As shown, developer workstation is coupled to network 206. Developer workstation 202 may access network 208 to retrieve a target application, operating system patches, and/or other suitable applications. In some embodiments, developer workstation 202 may be separated from and/or disconnected from network 208 during various processes described herein.

In the exemplary embodiment, developer workstation 202 is configured to operate according to a first operating system and a second operating system. For example, developer workstation 202 is configured to boot to a Windows® operating system and a Linux operating system. Alternatively, developer workstation 202 may include a first computing device 100 configured to operate according to one operating system and a second computing device 100 configured to operate according to a different operating system. Similarly, in various embodiments, target workstation 204 may be configured to operate according to one or more operating systems. An operating system may be any type of program code executable by workstations 202 and/or 204 to run one or more application and/or programs. Example operating systems include, without limitation, a Windows® operating system commercially available from Microsoft Corporation, a Linux operating system, a MAC operating system commercially available from Apple Inc., etc. In one example, developer workstation 202 boots to Windows Embedded XP Studio to perform one or more of the methods described herein.

Figure 3:
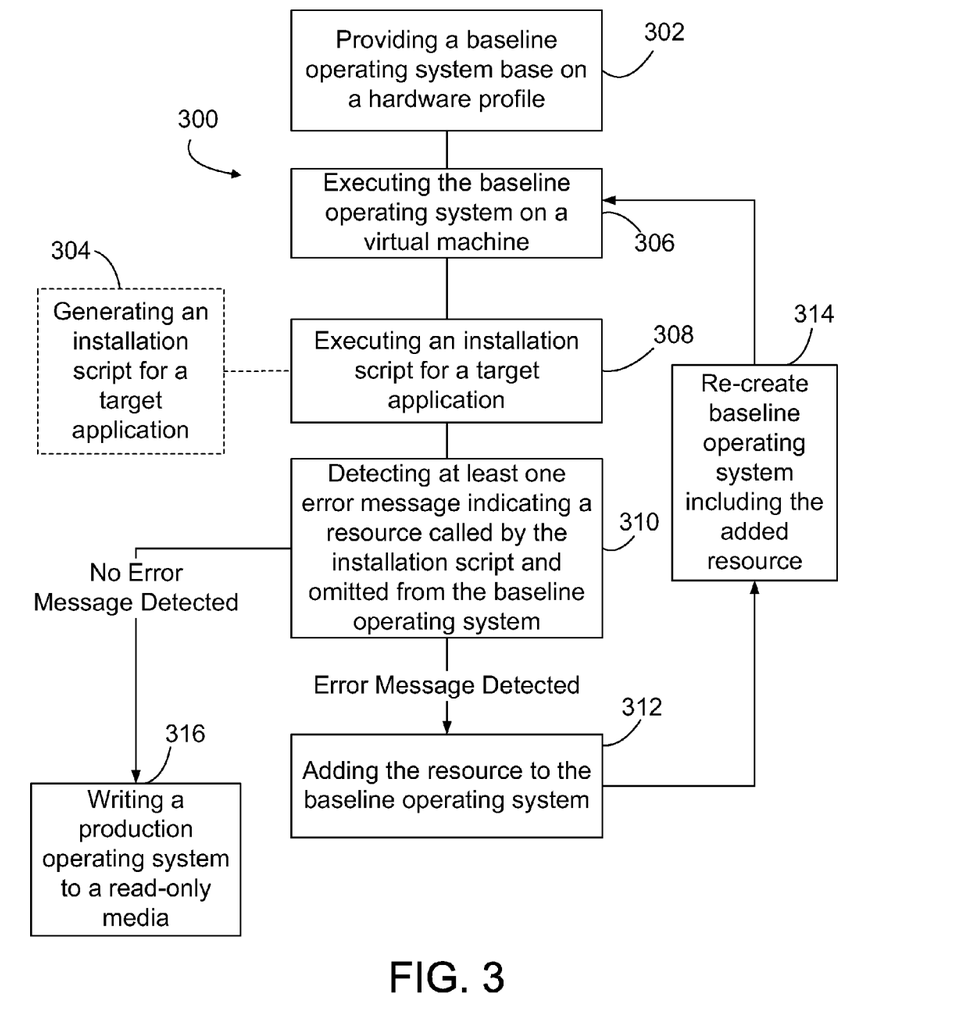
FIG. 3 is a block diagram of an exemplary method for use in generating a production operating system.

FIG. 3 illustrates an exemplary method 300 for use in generating a read-only production operating system for target workstation 204. Method 300 is described with reference to developer system 200. It should be appreciated that method 300 is not limited to the particular configuration of developer system 200. Likewise, it should be appreciated that developer system 200 may be employed to perform other methods consistent with the description herein.

Method 300 includes providing 302 a baseline operating system based on a hardware profile of target workstation 204. A baseline operating system includes an operating system subsntially free of unneeded and/or unnecessary applications, resources, etc. More specifically, a baseline operating system may include an operating system built with minimal components necessary for target workstation 204 to boot and/or operate according to its intended purpose. For example, target workstation 204 may be employed to program hardware devices, such PLDs, microprocessors, PGAs, etc., during a manufacturing process. When used as intended, target workstation 204 may not utilize a web browser or media player during operations. In such an example, resources exclusively called by a web browser application and/or a media player application may be omitted from an operating system to provide the baseline operating system. It should be appreciated that various applications may be included in an operating system, but not used by target workstation 204, when employed as intended. A baseline application may include substantially only resources known to be called by target workstation 204 during boot and/or according to its intended purpose. Specifically, a baseline operating system includes less than a generic operating system.

In the exemplary embodiment, the baseline operating system includes an enhanced write filter (EWF) to permit the operating system to be executed from read-only media. In other embodiments, one or more other programs may be included in the baseline operating system to permit the operating system to be executed on a read-only media or read/write media.

In the exemplary embodiment, the baseline operating system may be provided 302 by generating a hardware profile for target workstation 204 and writing the hardware profile to a read-only media, such as computer-readable media 118. In one example, a hardware profile may be generated by executing an application to interrogate target workstation 204 to identify hardware included therein. More specifically, processor 104 executes an application (e.g., TAP.exe, etc.) to identify hardware, such as a chipset driver, video card driver, CD-ROM driver, etc. The hardware profile identifies the hardware specific components to be included in the baseline operating system, so that the operating system may include drivers specific to the hardware identified and not additional, unused and/or unnecessary drivers. In one example, a generic Windows® operating system may include 50,000 different video card drivers. The hardware profile as described herein permits a developer of a baseline operating system to identify a video card included in target workstation 204 and include one video card driver specific to target workstation 204.

In the exemplary embodiment, the hardware profile is generated by target workstation 204 running according to a first operating system, such as Windows® operating system. Once the hardware profile is generated, target workstation 204 may be rebooted in a second operating system, such as Linux operating system, to write the hardware profile to a read-only computer-readable media, such as computer-readable media 118. In this manner, the hardware profile is generated in one operating system and written in another operating system. More specifically, target workstation 204 limits the inclusion of unwanted, operating system specific applications, such as Windows®-specific viruses, etc., by generating the hardware profile in one operating system and writing the hardware profile to a read-only computer-readable media in another operating system. Further, because the computer-readable media is read-only, only intentionally included applications and/or resources will be written to the computer-readable media. In at least one embodiment, the hardware profile may be written to a read-only media, by target workstation 204, along with hardware drivers associated with hardware identified by the hardware profile.

Figure 4:
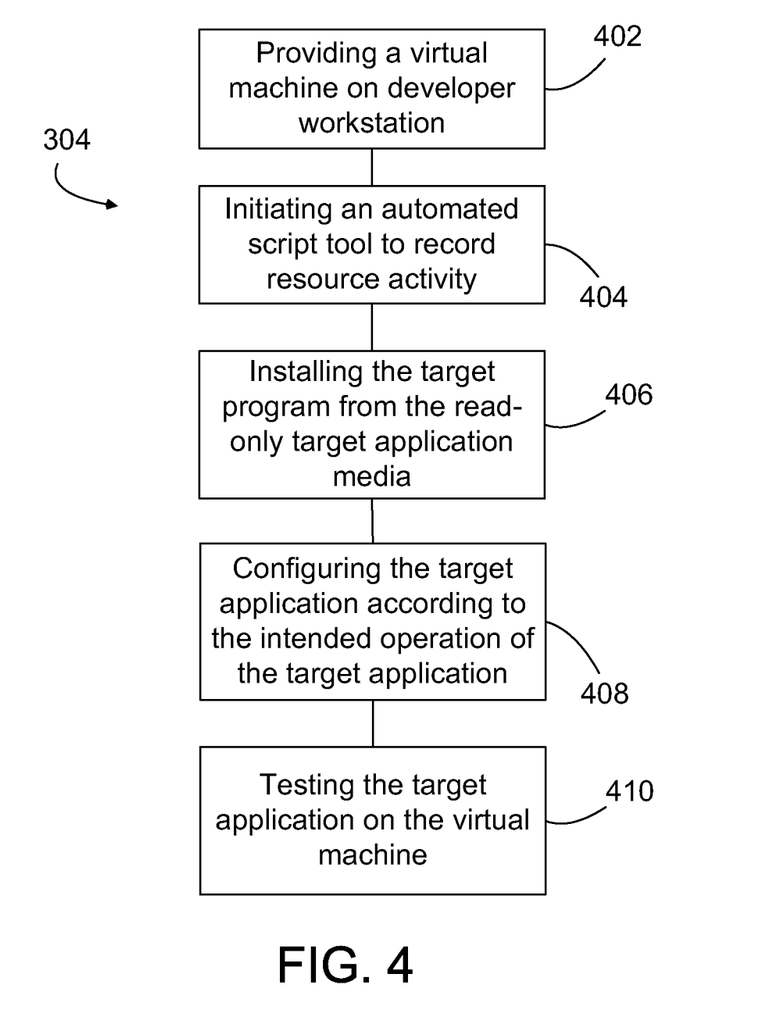
FIG. 4 is a block diagram of an exemplary method for use in generating an installation script.

Additionally, or alternatively, method 300 may include generating 304 an installation script for a target application. A target application may include any application executed on target workstation 204 when used as intended. For example, a target application may include a programming tool supplied by the manufacturer of an integrated circuit (IC), anti-virus application, operating system patch application, or other application employed by target workstation 204, etc. An exemplary method 304 for use in generating an installation script is illustrated in FIG. 4.

Figure 5:
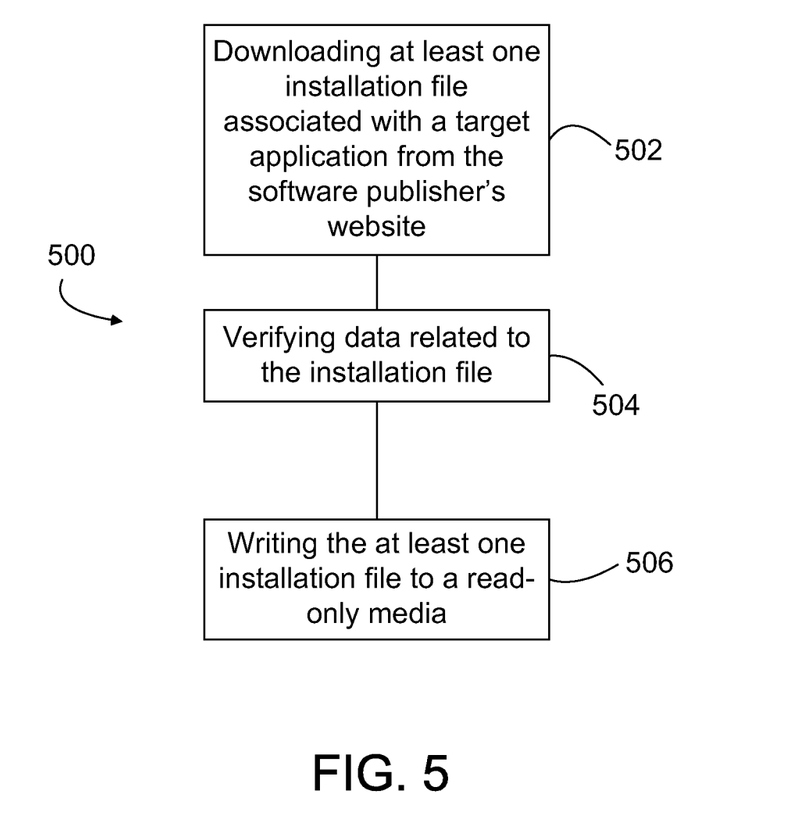
FIG. 5 is a block diagram of an exemplary method for use in providing a read-only target application media.

Prior to generating the installation script, a read-only target application media may be identified. In some embodiments, a target application may be provided from a manufacturer on a read-only media, such as a CD-ROM. In other embodiments, a target application may be acquired through network 208. When acquired through network 208, developer workstation 202 may employ an exemplary method 500 to provide the target application, including associated files, on read-only media, as illustrated in FIG. 5. More specifically, method 500 includes downloading 502 one or more installation files associated with a target application from the software publisher's website, verifying 504 data related to the installation files, and writing 506 the installation files to a read-only media. Validation data may include, without limitation, MD5, SHA1, or other data associated with the installation file and sufficient to check the integrity of the downloaded installation files. If target application is intended to be executed in a first operating system, developer workstation 202 may be operable according to a second operating system to perform method 500. Specifically, for example, an installation file for a Window®-based target application may be downloaded, validated, and written to a read-only media through use of a Linux operating system.

Referring again to FIG. 4, method 304 includes providing 402 a virtual machine on developer workstation 202 and initiating 404 an automated script tool to capture resource activity associated with generating the installation script. The virtual machine may be generated on developer workstation 202 or target workstation 204 through use of Windows® XP Embedded Studio. In one example, the script recorder application may include "AutoIt" script recorder, such as freeware AutoIt v3.

As illustrated, method 304 includes installing 406 the target program from the read-only target application media and configuring 408 the target application according to the intended operation of the target application. For example, developer 114 may select one or more settings of the target application to permit the target application to run as intended on target workstation 204. Additionally, method 304 includes testing 410 the target application on the virtual machine. Through installation, configuration, and testing, the recorder application records each resource called by processor 104 from the operating system and/or memory 106 to generate the installation script for the target application. It should be appreciated that an installation script may be generated for multiple target applications. For various target applications, resource calls related to configuration and/or testing of the target application may be omitted from the installation script.

Referring again to FIG. 3, method 300 includes executing 306 the baseline operating system with enhanced write filter in a virtual machine on developer workstation 202 and executing 308 the installation script.

When executed, the installation script performs each operation of the installation of the target application. More specifically, the installation script causes developer workstation 202 to access the read-only target application media as necessary. Because the baseline operating system was provided to include only the minimal resources to permit target workstation 204 to operate according to its intended purpose, one or more resources necessary to install the target application may be missing from the baseline operating system. Accordingly, in the exemplary embodiment, developer workstation 202 automatically detects 310 at least one error message indicating a resource called by the installation script and omitted from the baseline operating system. A resource may include, without limitation, a registry key, a file, and/or an instruction, etc.

When the error message is detected 310, developer workstation 202 automatically adds 312 the identified resource to the baseline operating system. Subsequently, developer workstation 202 causes the baseline operating system included each of the added resources to be re-created 314, and the new baseline operating system (including each of the added resources) to be executed 306 in the virtual machine. Developer workstation 202 continues to execute the baseline operating system (with added resources) until the target application is installed without an error message. Once installed, the installation script is executed 308 to configure target application for its intended use. As with installation, one or more resources called by the installation script during configuration of the target application may have been omitted from the baseline operating system. Accordingly, an error message may be detected 310 and a resource identified by the error message may be added 312 to the baseline operating system.

In the exemplary embodiment, once installed and configured, the installation script is executed 308 to test the target application. As with installation and configuration, one or more resources called by the installation script during testing of the target application may have been omitted from the baseline operating system. Accordingly, an error message may be detected 310 and a resource identified by the error message may be added 312 to the baseline operating system. Developer workstation 202 continues to re-create 314 the operating system including the added resources and to execute 306 the new operating system in the virtual machine until no error messages are received and the installation script has run completely.

It should be appreciated that method 300 may include one installation script for one target application or a different number of installation scripts for a different number of target applications. Target applications may include a manufacturing tool, a programming tool, an anti-virus application, an intrusion detection application, a malware detection application, an anti-malware application, a driver application specific to target workstation 204, or other applications intended to be used and/or called during operation of target workstation in its intended function. Each installation script may be generated and executed consistent with the disclosure above to incorporate the target application with the baseline operating system.

Once each of the installation scripts has been completed, the resulting baseline operating system including each of the added resources is considered a production operating system. Developer workstation 202 writes 316 the production operating system to a read-only media, such as computer-readable media 118. In the exemplary embodiment, developer workstation 202 is rebooting into a different operating system, such as Linux, to write the production operating system to the read-only media. The read-only media is subsequently used to boot target workstation 204 in the production environment, for example, to permit target workstation 204 to perform as intended.

When a production operating system is generated consistent with the description herein, the production operating system is provided with a reduced attack surface as compared to known methods. Specifically, the production operating system includes substantially only resources necessary for operation of target workstations as intended. Additionally, by switching between operating systems during generation of production operation systems, the methods described herein may reduce the risk of an unwanted application, such as a virus or malware, following the baseline operating system through to a production operating system. It should be further appreciated that the automated nature of the exemplary embodiments described herein may provide for increased efficiency and cost reductions, as compared to known methods of generating operating systems.

Further, because the production operating system is written to a read-only media, the methods described herein substantially limit the ability of unwanted application to "infect" target workstation 204 booted from the read-only media. Moreover, to the extent unwanted application "infect" target workstation 204, target workstation 204 may be rebooted with the read-only production operating system media to return to an operating system substantially free of unwanted applications. More specifically, unwanted applications would not be able to survive reboot of the read-only media. In this manner, the methods describe here provide protection against both known and unknown unwanted applications.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of generating a read-only production operating system including at least one application for use with a target workstation, said method comprising:
    providing a baseline operating system based on a hardware profile of the target workstation;
    executing the baseline operating system in a virtual machine generated in a first operating system on a computing device;
    executing a target application in the virtual machine and recording each resource called by a processor in the computing device while executing the target application;
    generating an installation script from the recorded resources;
    executing, at the computing device, the installation script for the target application;
    adding at least one resource to the baseline operating system based on an error message indicating at least one resource called by the installation script is not found; and
    while executing a second operating system that is different from the first operating system, writing, at the computing device, a production operating system to a read-only media, the production operating system including the baseline operating system and said at least one resource.

2. The method of claim 1, wherein executing the installation script includes executing the installation script comprising a plurality of resource calls for installing the target application to the baseline operating system.

3. The method of claim 2, wherein the installation script comprises a plurality of resource calls for configuring the target application.

4. The method of claim 3, wherein the installation script comprises a plurality of resource calls for testing the target application.

5. The method of claim 1, further comprising detecting the error message indicating the at least one resource called by the installation script is not found in the baseline operating system, the resource including at least one of a file, a registry key and an instruction.

6. The method of claim 1, further comprising downloading an installation file associated with a target application from the software publisher's website and writing the installation files to a read-only media, while executing a first operating system.

7. The method of claim 6, wherein the first operating system is different in type than the baseline operating system.

8. The method of claim 1, further comprising creating a hardware profile for a target workstation.

9. The method of claim 1, wherein executing the baseline operating system in a virtual machine further comprises executing the baseline operating system using an enhanced write filter.

10. The method of claim 1, wherein the installation script is a first installation script and the target application is a first target application, said method further comprising executing a second installation script for a second target application; and
wherein adding the at least one resource to the baseline operating system further comprises adding the at least one resource to the baseline operating system based on an error message indicating that the at least one resource called by at least one of the first installation script and the second installation script is not found.

11. The method of claim 1, wherein the target application includes at least one of an operating system patch application, an anti-virus application, a malware detection application, and an anti-malware application.

12. The method of claim 1, further comprising running the production operating system, from the read-only media, on a target workstation.

13. A developer workstation for generating a read-only production operating system including at least one application for use with a target workstation; said developer workstation comprising:
a memory including a plurality of resources; and
at least one processor coupled to the memory, said at least one processor configured to:
generate, in a first operating system, a virtual machine for booting a baseline operating system, wherein the baseline operating system is configured for a target workstation and includes an enhanced write filter;
execute the baseline operating system in the virtual machine;
execute a target application in the virtual machine and record each resource called by the at least one processor while executing the target application;
generate an installation script from the recorded resources;
execute the installation script for the target application to the baseline operating system;
detect at least one error message indicating at least one resource called by the installation script and omitted from the baseline operating system;
add the at least one resource from said memory to the baseline operating system; and
while executing a second operating system that is different from the first operating system, write a production operating system to a read-only media, wherein the production operating system includes the baseline operating system and the at least one resource.

14. The system of claim 13, wherein the installation script includes program code to install and configure the target application.

15. The system of claim 13, wherein the target application includes at least one of an anti-virus application and a programming tool application.

16. The system of claim 13, wherein the resource includes at least one of a file, a registry key and an instruction.

17. A method of generating a read-only production operating system including at least one application for use with a target workstation, said method comprising:
providing a baseline operating system with an enhanced write filter based on a hardware profile of the target computing device,
(a) executing the baseline operating system on a virtual machine generated in a first operating system on a computing device;
(b) executing a target application in the virtual machine and recording each resource called by a processor in the computing device while executing the target application;
(c) generating an installation script from the recorded resources;
(d) executing, on the computing device, an installation script for a target application;
(e) detecting at least one error message indicating a resource called by the installation script and omitted from the baseline operating system, the resource including at least one of a file, a registry key and an instruction;
(f) adding the resource to the baseline operating system;
repeating steps (a) thru (f) until the installation script is executed without an error message; and
while executing a second operating system that is different from the first operating system, writing, at the computing device, a production operating system to a read-only media, the production operating system including the baseline operating system and said resource(s) added to the baseline operating system during step (f).

18. The method of claim 17, wherein the installation script includes a plurality of resource calls for installing and configuring the target application on the baseline operating system.

19. The method of claim 17, further comprising downloading an installation file associated with the target application from a website of a software publisher associated with the target application.

* * * * *